United States Patent

Latham

[11] Patent Number: 6,070,912
[45] Date of Patent: Jun. 6, 2000

[54] DUAL SEAL AND CONNECTION

[75] Inventor: Raymond E. Latham, Houston, Tex.

[73] Assignee: Reflange, Inc., Houston, Tex.

[21] Appl. No.: 08/794,400

[22] Filed: Feb. 5, 1997

Related U.S. Application Data

[63] Continuation of application No. 08/410,833, Mar. 27, 1995, abandoned, which is a continuation-in-part of application No. 07/650,888, Feb. 5, 1991, abandoned, which is a continuation-in-part of application No. 07/388,587, Aug. 1, 1989, abandoned.

[51] Int. Cl.$^7$ ..................................................... F16L 3/00
[52] U.S. Cl. ........................... 285/61; 285/93; 285/94; 285/148.19; 285/328; 285/331; 285/334.2; 285/351; 285/367; 285/416; 285/917; 285/15; 285/294.4; 29/428
[58] Field of Search ............................ 285/93, 342, 331, 285/917, 906, 334.2, 294.4, 913, 149.19, 94, 148.19, 328, 351, 367, 416; 29/428; 277/530, 612

[56] References Cited

U.S. PATENT DOCUMENTS

| | | |
|---|---|---|
| Re. 33,199 | 4/1990 | Karr ........................................ 277/530 |
| 349,146 | 9/1886 | Duff ..................................... 285/149.19 |
| 1,781,091 | 11/1930 | Wilson . |
| 1,782,484 | 11/1930 | Spencer et al. ..................... 285/906 X |
| 1,821,867 | 9/1931 | Wilson . |
| 1,906,826 | 5/1933 | Smith et al. ............................. 277/530 |
| 2,211,983 | 8/1940 | Parris . |
| 2,464,744 | 3/1949 | Fennema . |
| 2,624,308 | 1/1953 | Wittlin .................................. 285/93 X |
| 2,742,274 | 4/1956 | Edvar . |
| 2,761,707 | 9/1956 | Herman . |
| 2,766,829 | 10/1956 | Watts et al. . |
| 2,766,998 | 10/1956 | Watts et al. . |
| 2,766,999 | 10/1956 | Watts et al. . |
| 2,769,234 | 11/1956 | Young . |
| 2,938,562 | 5/1960 | Watts et al. . |
| 2,954,797 | 10/1960 | Dryer . |
| 3,021,974 | 2/1962 | Watts . |
| 3,051,513 | 8/1962 | Watts et al. . |
| 3,055,537 | 9/1962 | Watts . |
| 3,078,110 | 2/1963 | Starr . |
| 3,095,110 | 6/1963 | Pierce, Jr. . |
| 3,141,685 | 7/1964 | Watts . |
| 3,150,889 | 9/1964 | Watts . |
| 3,159,302 | 12/1964 | Latham et al. . |
| 3,201,149 | 8/1965 | Bragg . |
| 3,208,758 | 9/1965 | Carlson et al. . |
| 3,216,746 | 11/1965 | Watts . |
| 3,231,297 | 1/1966 | Watts et al. . |
| 3,253,336 | 5/1966 | Brown . |
| 3,325,176 | 6/1967 | Latham et al. . |
| 3,364,523 | 1/1968 | Schippers ............................... 285/93 X |
| 3,400,950 | 9/1968 | Quebe et al. . |
| 3,476,409 | 11/1969 | Benteler et al. . |
| 3,479,063 | 11/1969 | Raver . |
| 3,499,671 | 3/1970 | Osborne . |
| 3,556,568 | 1/1971 | King . |
| 3,749,426 | 7/1973 | Tillman, III . |

(List continued on next page.)

FOREIGN PATENT DOCUMENTS

| | | |
|---|---|---|
| 240658 | 6/1965 | Austria . |
| 392878 | 7/1923 | Germany . |
| 1965422 | 7/1970 | Germany . |
| 46-35801 | 2/1968 | Japan . |
| 1-288693 | 11/1989 | Japan . |
| 4-4388 | 1/1992 | Japan . |
| 165273 | 12/1968 | Netherlands . |
| 1342 | 5/1870 | United Kingdom . |
| 2116276A | 9/1983 | United Kingdom . |

OTHER PUBLICATIONS

Hydril Company Brochure, Copyright 1994, "C–Con™ Threaded Pipeline Connector for J–Lay".

*Primary Examiner*—Dave W. Arola
*Attorney, Agent, or Firm*—Howrey Simon Arnold & White, LLP

[57] ABSTRACT

A dual seal is provided for establishing fluid tight engagement between conduits subjected to both internal and external pressure. The dual seal comprises four seal portions disposed between an inner and an outer cylindrical surface.

36 Claims, 9 Drawing Sheets

U.S. PATENT DOCUMENTS

| | | |
|---|---|---|
| 3,820,830 | 6/1974 | Dryer . |
| 3,836,159 | 9/1974 | Dryer . |
| 3,873,105 | 3/1975 | Wehner . |
| 3,888,496 | 6/1975 | Dryer . |
| 3,989,285 | 11/1976 | Yancey . |
| 4,002,359 | 1/1977 | Lari . |
| 4,214,763 | 7/1980 | Latham . |
| 4,408,771 | 10/1983 | Shelton . |
| 4,410,186 | 10/1983 | Pierce, Jr. . |
| 4,474,381 | 10/1984 | Wilkins et al. . |
| 4,563,025 | 1/1986 | Poe ........................................ 285/334.2 |
| 4,603,889 | 8/1986 | Welsh . |
| 4,709,933 | 12/1987 | Adamek et al. . |
| 4,762,344 | 8/1988 | Perkins et al. . |
| 4,867,483 | 9/1989 | Witt et al. ........................... 285/917 X |
| 4,881,760 | 11/1989 | Runkles et al. . |
| 4,893,844 | 1/1990 | Chelette et al. . |
| 5,277,457 | 1/1994 | Hayashi . |
| 5,355,908 | 10/1994 | Berger et al. . |

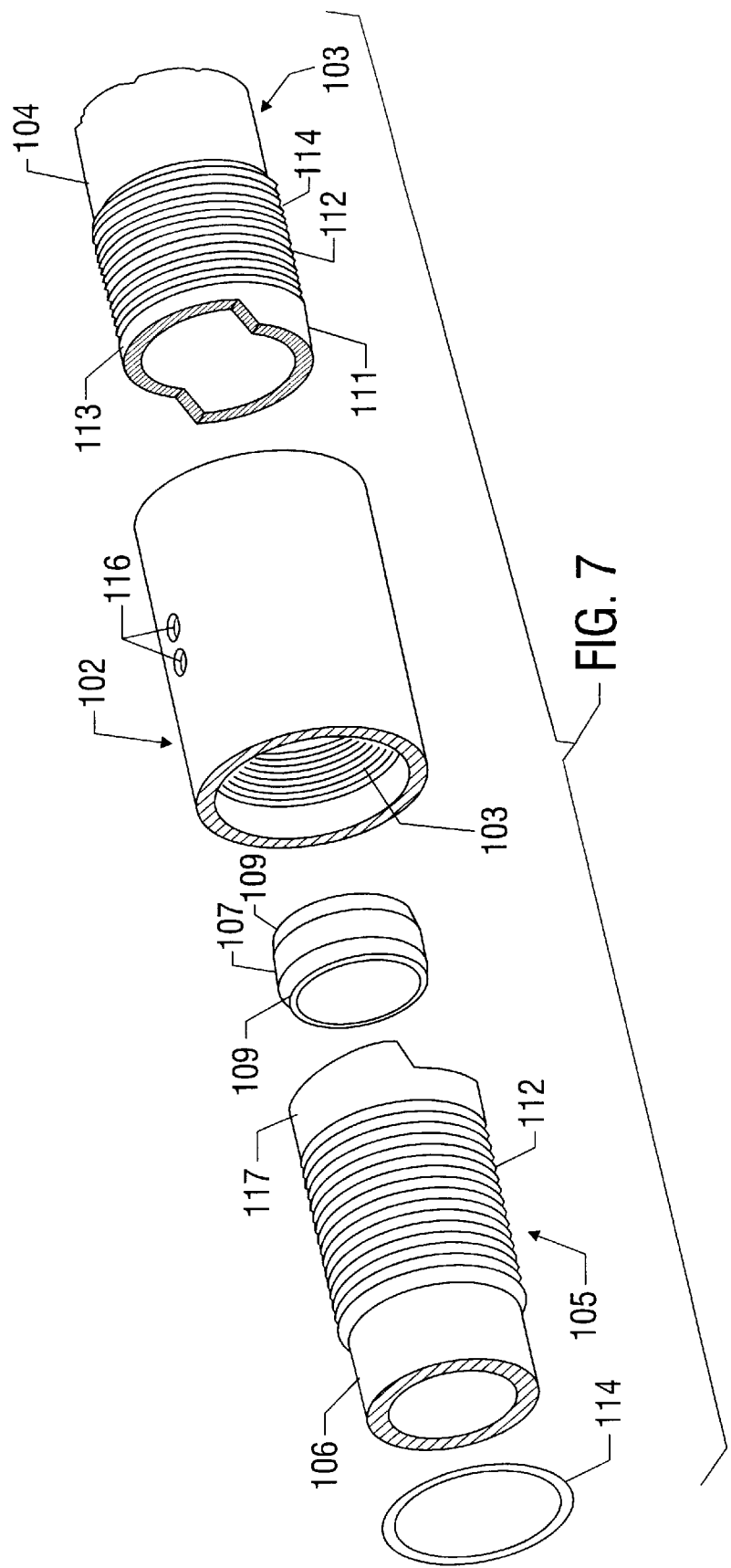

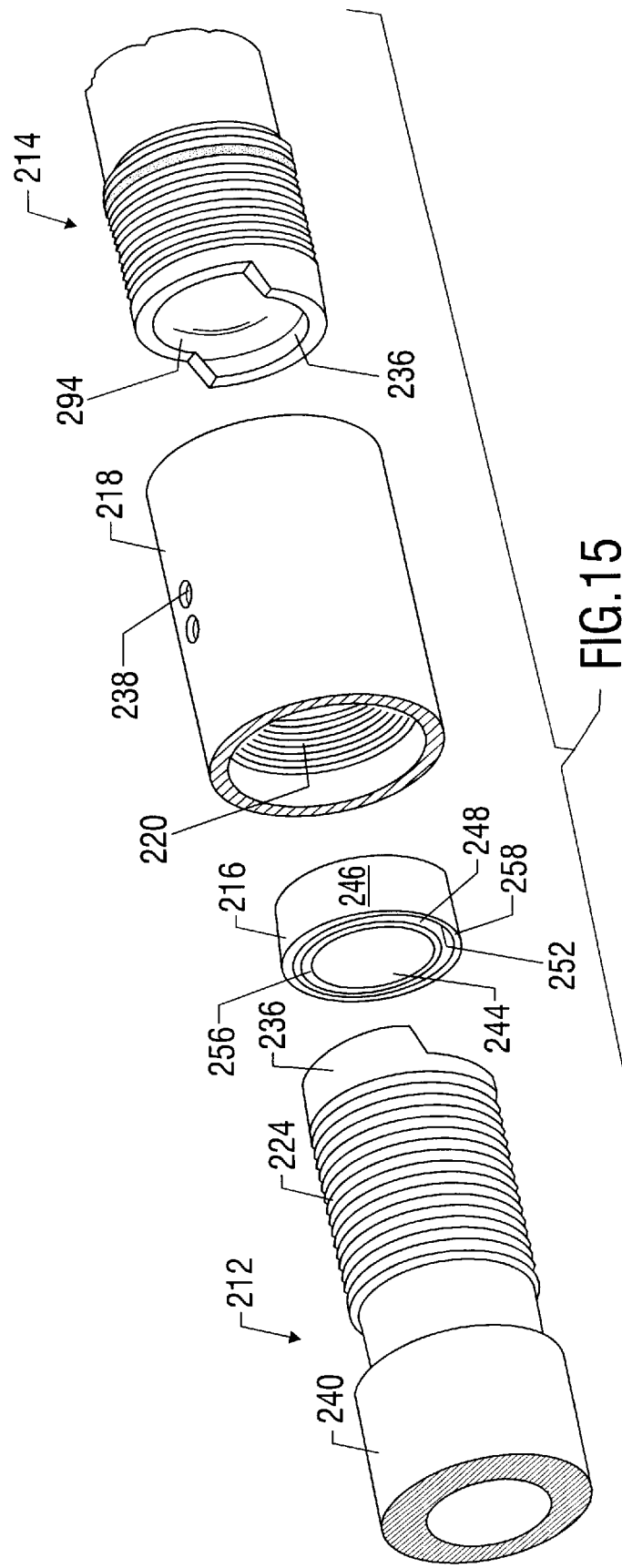

DUAL SEAL AND CONNECTION

CROSS REFERENCE TO RELATED APPLICATIONS

This is a continuation of application Ser. No. 08/410,833, filed Mar. 27, 1995, which is a continuation-in-part of application Ser. No. 07/650,888, filed Feb. 5, 1991, which is a continuation-in-part of application Ser. No. 07/388,587, filed Aug. 1, 1989, all now abandoned.

This application is a continuation-in-part of application Ser. No. 650,888, filed on Feb. 5, 1991, now pending, which is a continuation-in-part of application Ser. No. 388,587, filed on Aug. 1, 1989, now abandoned.

BACKGROUND OF THE INVENTION

1. Field of the Invention

The present invention relates generally to a dual seal mechanical connection. More specifically, the present invention relates to a mechanical pipe connection system for use in rigorous marine environments under both internal and external pressure and a method for its implementation.

2. Description of the Prior Art

The development of the petrochemical industry has emphasized the need for means to transport oil, gas and other fluids over considerable distances and often under rigorous conditions. The means to transport such fluids most often have taken the form of marine or terrestrial pipelines that link virtually all petrochemical production sites with refining and distribution facilities. Generally these pipelines are comprised of identical pipe segments that are welded end-to-end in an abutting relationship. Such welded pipelines, tend to be expensive to construct, and considerable testing must be undertaken to evaluate the integrity of the welded pipe joint. Moreover, this evaluation process must be continuously repeated over the life of the pipeline.

In addition to being able to withstand internal pressurization, marine flow lines, for example, must be able to withstand the high external pressures associated with placement along the seabed. As a consequence, exotic, high strength materials such as titanium have been used for such applications. Materials such as titanium, however, are very difficult to weld using conventional welding techniques. More conventional heat treated metals are also inappropriate for such applications, since welding destroys the strengthening property of the heat treated pipe section.

In addition to welded pipelines, a variety of mechanically coupled pipelines have been proposed. These mechanically joined pipelines are usually constructed of flanges or clamps that result in large diameter joint segments that can not be used easily in J-tubes. Mechanical pipe joints utilizing conventional threaded connections are often prone to loosen over a period of time, thereby rendering their use suspect for marine applications.

There exists a variety of seals or gaskets that are used to seal between flanges or other types of connectors. Such prior art seals may be generally categorized as those sealing elements that seal on the bore of the connector and those elements that seal on the face of the connector. In both categories, sealing usually is achieved by crushing or yielding (plastically deforming) the gasket; by elastically loading a flexible gasket utilizing a soft coating or plating on the seal surface; or by a combination of the two. These seals may or may not be pressure energized as dictated by their relative geometry and location in the connector.

Because of their relatively massive cross sections, some bore seals require considerably more bolt-up loading then do face seals. Alternatively, bore seals may be more economical due to lower manufacturing tolerances. Additionally, many or most bore seals are self centering, whereas face seals are generally extremely sensitive to misalignment. Flexible bore seals are particularly adaptable to high temperature use because they are radically compressed during make-up, resulting in residual seal loading.

Some prior art bore seals include a design having a flange portion oppositely disposed flexible lips and a centrally disposed rib portion. The lips of the seal are provided with annular sealing surfaces which taper outwardly toward the rib portion. Disadvantages, however, exist in the manufacture of such a design. While this type of seal is basically a bore seal, it incorporates some of the characteristics of a face seal, due to the presence of the rib portion which is normally disposed between the end faces of the connectors with which it is used. As a result, such a design requires higher manufacturing tolerances and is therefore more expensive to manufacture.

One solution to this problem was posed by Latham, as disclosed in U.S. Pat. No. 4,214,763. Latham discloses a flexible annular bore seal for sealing between first and second coaxially aligned members. In Latham, each of the first and second coaxially aligned members are provided with an internal frusto-conical sealing surface tapering inwardly toward the adjoining ends.

The present invention is directed to an improved mechanical connection for joining two conduits or pipes in fluid tight engagement. The present invention comprises a dual seal that provides fluid tight engagement against internal as well as external pressure.

SUMMARY OF THE INVENTION

In one aspect of the present invention, a mechanical connection for joining conduits is provided. The mechanical connection comprises a first conduit having an end with a seat portion having first and second seats. The first conduit also has external threads. A second conduit having an end with first and second seats. The second conduit also having external threads. A seal member comprising four sealing surfaces wherein two of the sealing surfaces are adapted to sealingly engage with the first and second seats of the first conduit, and the other two sealing surfaces adapted to sealingly engage with the first and second seats of the second conduit. And, a sleeve having internal threads that are adapted to engage the external threads of the first and second conduits. The sleeve is further adapted to bring the ends of the conduits into abutting relation and elastically deformed the seal member to create a fluid tight connection.

In another embodiment of the present invention, a dual seal for a mechanical connection is provided that comprises an inner cylindrical surface and an outer cylindrical surface. Four seal portions are disposed between the inner and outer cylindrical surfaces and each of the seal portions comprise a frusto-conical seal surface.

Still another embodiment of the present invention provides a method for mechanically joining conduits in fluid tight engagement comprising the steps of providing a first conduit having an end with first and second seats and external threads. Placing a seal member comprising four sealing surfaces on the first and second seats of the first conduit. Threading a first end of a sleeve having internal threads onto the external thread of the first conduit. Threading a second conduit having an end with a with first and second seats and external threads into another end of the sleeve. Rotating said sleeve to bring the first and second seats of the second conduit into contact with the other two sealing surfaces of the seal member. And, rotating further the sleeve to bring the ends of the first and second conduits into abutting relation thereby energizing the seal member's sealing surfaces into fluid tight engagement with associated seats.

BRIEF DESCRIPTION OF THE DRAWING

Other objects and advantages of the invention will become apparent upon reading the following detailed description and upon reference to the drawings in which:

FIG. 7 is an exploded perspective view of the embodiment of FIG. 6.

FIG. 15 is an exploded perspective view of the embodiment of FIG. 10.

DESCRIPTION OF THE PREFERRED EMBODIMENT

Figure 1:
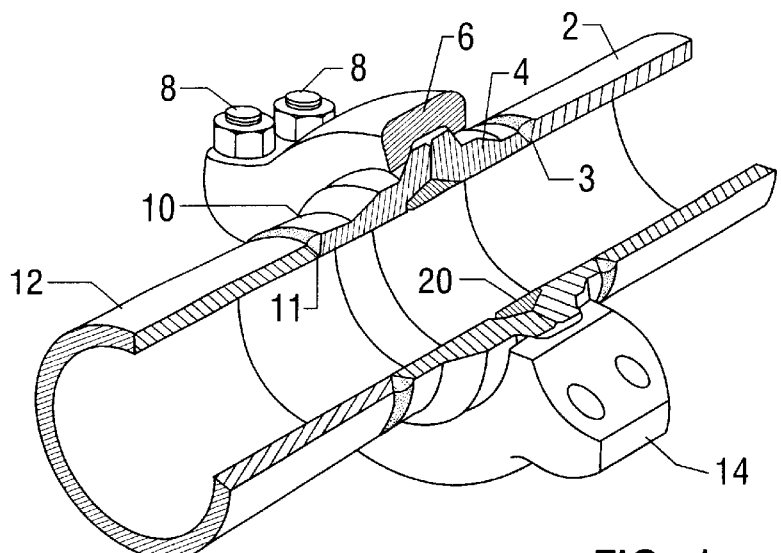
FIG. 1 is a perspective view illustrating a clamp type connection incorporating a seal of the present invention.
Figure 2:
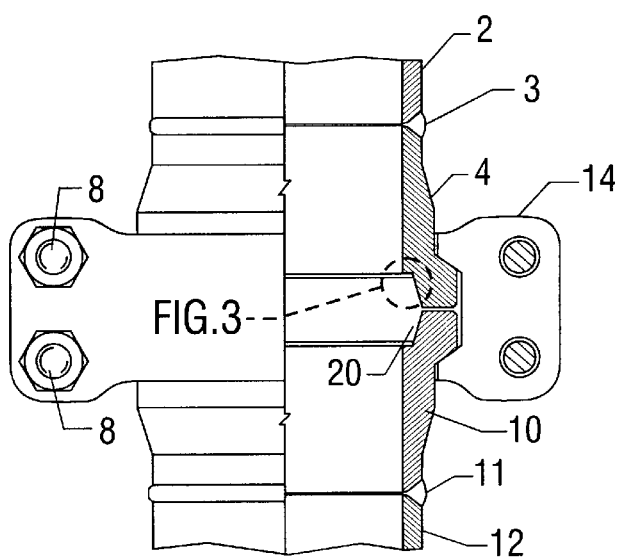
FIG. 2 is a partial, cross section of a clamp type connection incorporating a seal of the present invention.

FIG. 1 represents a perspective view of coaxially aligned pipe sections 2 and 12 connected by a pair of flanges 4 and 10, respectively. Flanges 4 and 10 may be attached to the pipe sections 2 and 12 by welding, as illustrated at 3 and 11, or by any other suitable means. Flanges 4 and 10 may be coupled together by bolts, clamps or other suitable means conducive to the formation of a high pressure seal. As illustrated in FIGS. 1 and 2, flanges 4 and 10 are preferably held together by a clamp arrangement which includes a pair of "C" clamps 6 and 14 which are interconnected by suitable fasteners 8. In a preferred embodiment of the present invention, prior to connection of flanges 4 and 10 a bore seal 20 is placed in the bore of flanges 4 and 10 so as to establish a sealing connection therebetween.

Figure 3:
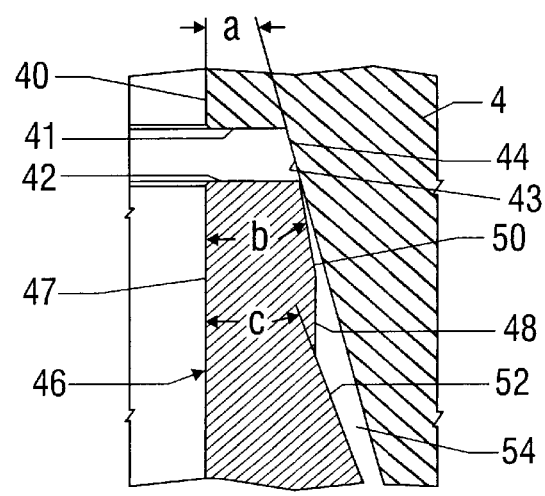
FIG. 3 is a detailed view illustrating the sealing surface of the present invention incorporated in a connector shown in association with a seating surface.
Figure 4:
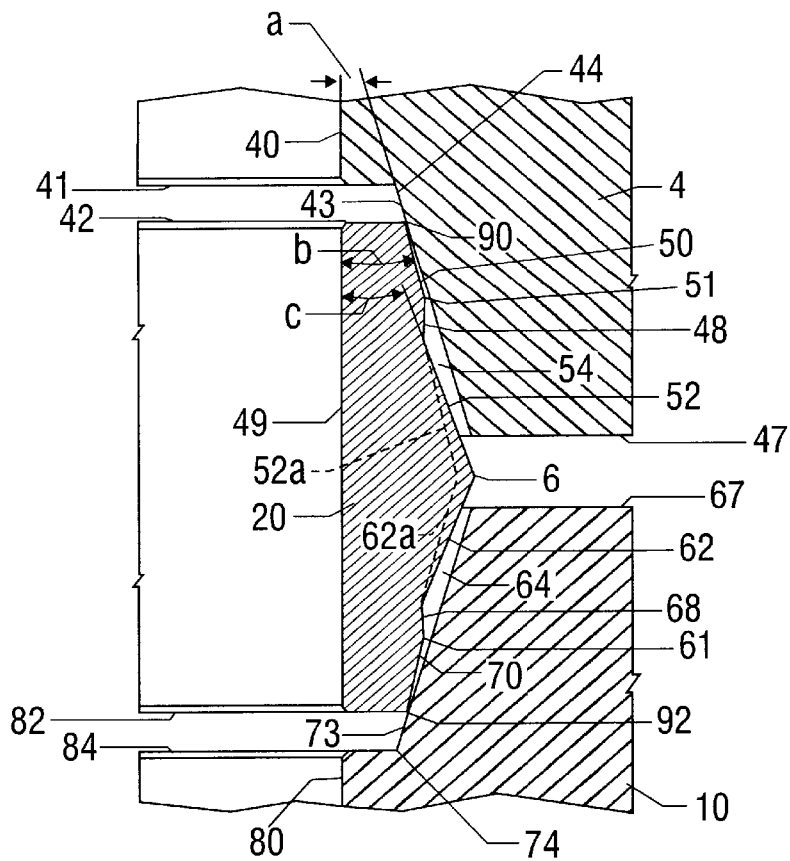
FIG. 4 is a detailed view of a preferred embodiment of the present invention illustrating the angular relationship of the sealing surfaces to the seating surfaces prior to make-up of the seal.
Figure 5:
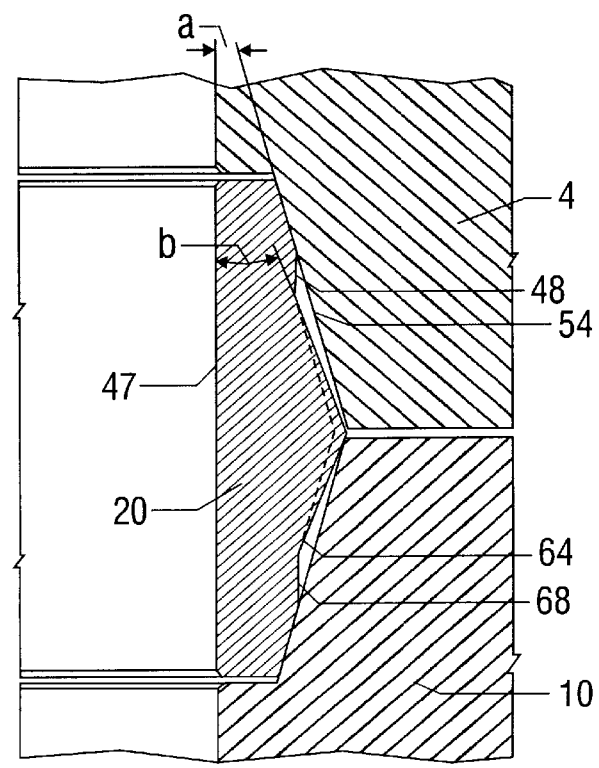
FIG. 5 is a detailed view of the embodiment illustrated in FIG. 4 subsequent to substantial make-up of the seal.

A detailed view of flanges 4 and 10 may be seen by reference to FIGS. 3–5. Flanges 4 and 10 are provided with internal or frusto-conical seating surfaces 43 and 73, respectively,-tapering inwardly from adjoining end faces 47 and 67 of the flanges. The opposite ends of the frusto-conical seating surfaces 43 and 73 preferably terminate at annular shoulders 41 and 84 at the end of flange bores 40 and 80.

In a preferred embodiment, the angle of taper between the axis of the flange members 4 and 10 and their respective frusto-conical seating surfaces 43 and 73, as illustrated at "a," is preferably in the range of 15°–20°.

Referring to FIGS. 4–5, seal member 20 generally comprises an inner cylindrical surface 49 and annular end surfaces 42 and 82 at opposite ends thereof. The external sealing surfaces of member 20 are generally separated from taper surfaces 52 and 62 by cylindrical relief rings 48 and 68. As divided by rings 48 and 68, the topical external surface of member 20 defines a sealing surface (50, 70) and a lower (52, 62) taper surface. In alternate embodiments, surfaces 48 and 68 may vary from a position parallel to the coaxial members so as to provide a greater relief area as will be further described herein.

In a preferred embodiment, the taper angle "c" of taper surfaces 52 and 62 is greater than the taper angle "a" of the frusto-conical seating surfaces 43 and 73 as measured from the axis of the cylindrical members. Alternatively, the taper angle "c" of the taper surfaces may be machined at the same taper angle "a" as the sealing surfaces 43 and 73, resulting in the configuration illustrated by dotted lines at 52a and 62a.

Sealing surfaces 50 and 70 are formed with yet a third angle of taper "b." In a preferred embodiment, the taper angle "b" of sealing surfaces 50 and 70 is less than that of both the taper surfaces and of the frusto-conical seating surfaces. Preferably, taper angle "b" is approximately ½° less than taper angle "a."

Taper surfaces 52 and 62 of member 20 converge to form an alignment ring surface 6 approximately midway between ends 42 and 82. When viewed in cross section as in FIGS. 3–5, ring surface 6 defines a point.

The position of ring surface 6 relative to ends 42 and 82 may vary as determined by the configuration of flange 4 and 10. A second set of alignment ring surfaces 51 and 61 are defined at the intersection of sealing surfaces 50 and 70 and relief rings 48 and 68. Yet a third set of shoulder ring surfaces 90 and 92 are formed by the intersection of sealing surfaces 50 and 70 and annular end surfaces 42 and 82.

In a preferred embodiment, shoulderring surfaces 90 and 92 are subtly defined along faces 50 and 70 due to the minimal angle differentiation (½°) between the surfaces when measured from the axis of the cylindrical members. This minimal angular differentiation prohibits "leaking" of sealing surfaces 50 and 70 at alignment ring surfaces 51 and 61 varies might result in a non uniform sealing surface.

Due to the angular variations between the sealing and seating surfaces, dual dimensional annular relieved areas 54 and 64 are defined between alignment ring surface 6 and shoulderring surfaces 90 and 92. The displacement of areas 54 and 64 are determined by the angular differentiation between the taper and frusto-conical sealing surfaces 43 and 73 and the sealing and taper surfaces of sealing member 20. Additionally, this displacement may be varied by the length of relief rings 48 and 68.

It is understood that as with other flexible type bore seals, the radial dimensions of the external sealing surfaces of seal member 20 will be accentuated prior to installation.

However, when the connection is properly made, these sealing surfaces generally assume the position illustrated in FIG. 5. Since the areas of these sealing surfaces are predetermined the loading forces used in making up the seal may also be predetermined. It is noted that the distance between the annular shoulder 41 and 84 of the respective flanges is slightly greater than the axial length of the seal member 20. These shoulders 41 and 84, coupled with end surfaces 42 and 82 of the seal member 20 and the alignment ring surfaces, result in self-alignment of the seal as the flanges 4 and 10 are clamped together.

It will also be noted that the diameter of the inner cylindrical surface 49 of the seal 20, when the flanges 4 and 10 are properly connected, is substantially the same as the adjoining bore diameters 40 and 80. This eliminates turbulence and the erosion and corrosion associated with such turbulence. Due to this bore configuration, the pressure internally of the connection exerts additional forces against the seal so that it is also pressure energized.

Thus, it is seen that the flexible pressure energized bore seal of the present invention is one which offers superior sealing and alignment characteristics. It is also easily and economically manufactured.

Figure 6:
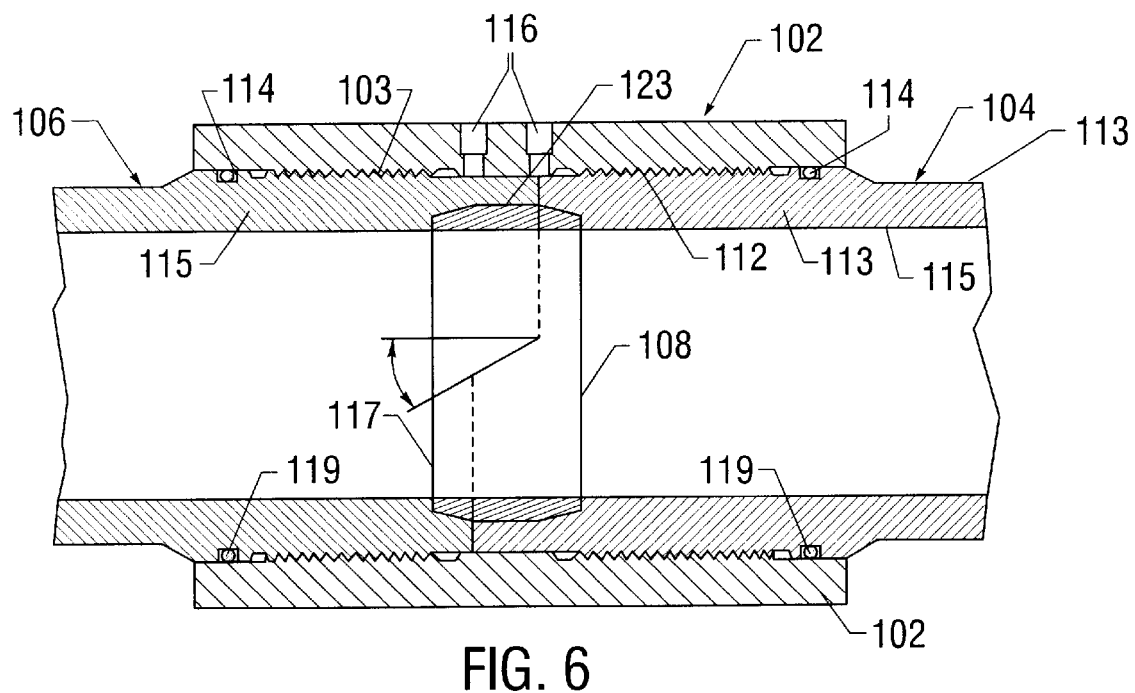
FIG. 6 is a cross-sectional view of a preferred embodiment of the present invention illustrating the relationship of the pipe section, the bore seal and the connector sleeve.
Figure 8:
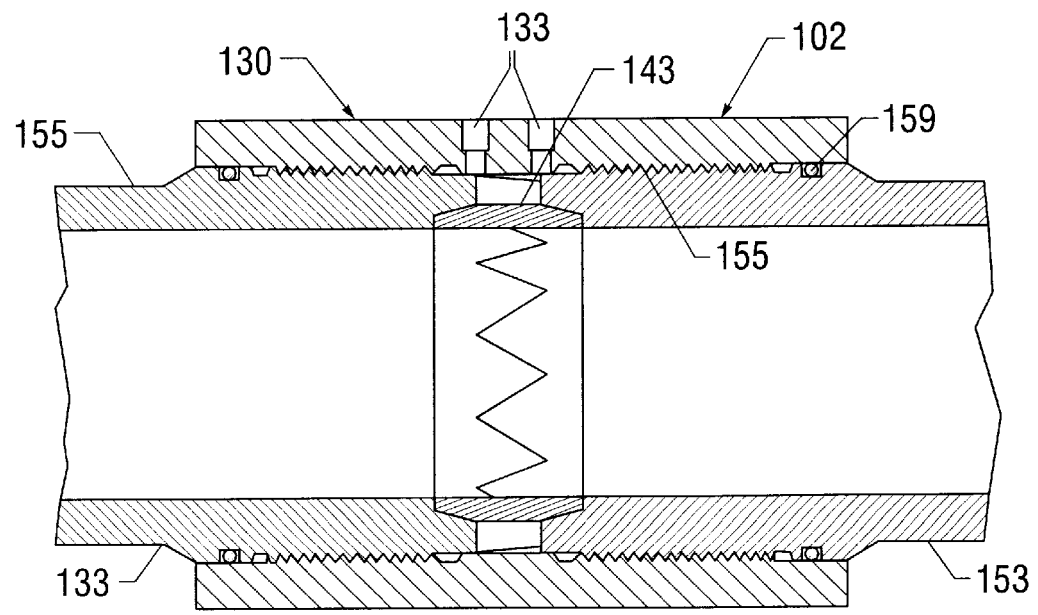
FIG. 8 is a cross-sectional view of another embodiment of the present invention.
Figure 9:
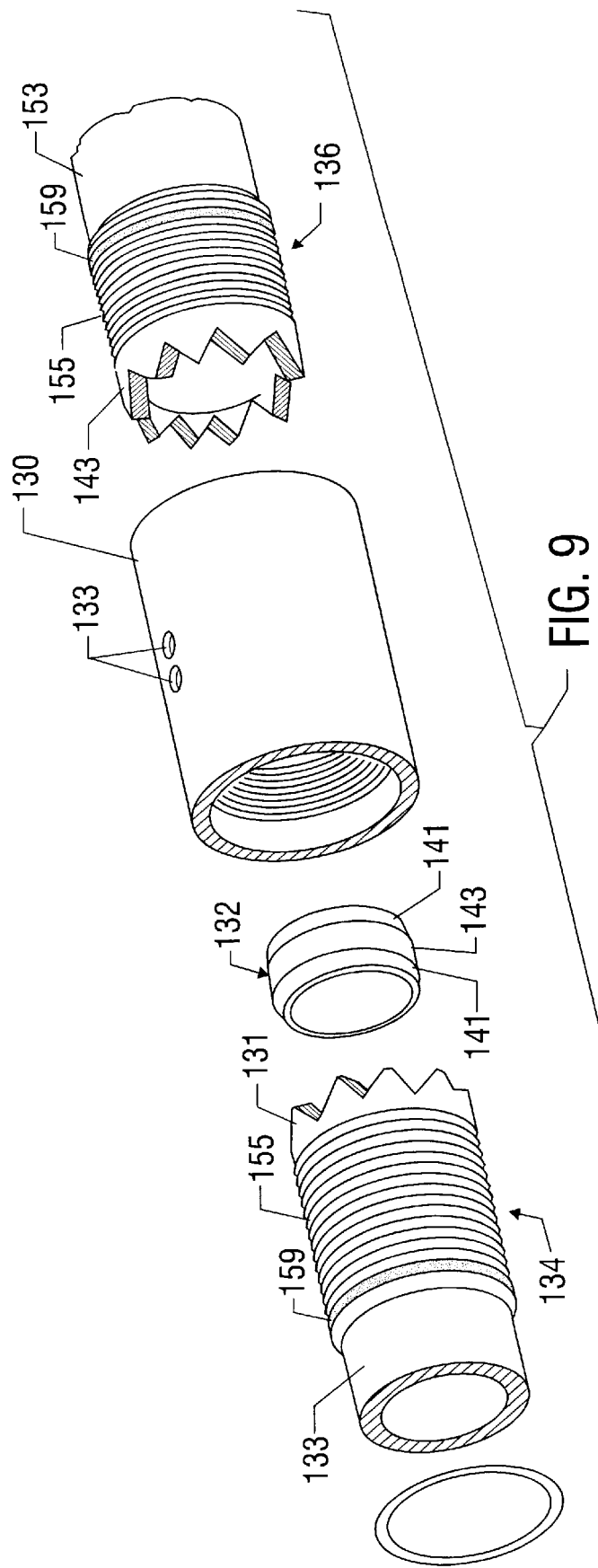
FIG. 9 is an exploded perspective view of the embodiment of FIG. 8.

FIG. 6 illustrates a coaxially aligned first 106 and second 104 pipe section or joint joined in an abutting, end-to-end relationship so as to encapsulate a bore seal 108. The first and second pipe sections and bore seal 108 are held in a sealing relationship by a connector sleeve 102 which is threaded thereon as will be further described herein.

In the embodiment illustrated in FIG. 6, pipe sections 104 and 106 each generally comprise an intermediate portion 113 and two connector ends 115 and 115'. Connector ends 115 and 115' are externally threaded and incorporate straight as opposed to tapered threads 112. Connector ends 115 and 115' are also oppositely threaded so that the end-to-end union of two such pipe segments results in uniform right and left hand threads which are compatible with similar threads in connector sleeve 102 as will be further described. To enhance the strength of the connector system, it is preferred that connector ends 115 and 115' and connector sleeve 102 be provided with buttress threads, though it is envisioned that Acme threads or straight threads may also be utilized.

The length of the threaded portion 112 of each connector end 115 and 115' is preferably determined by the recommended length of engagement of the specific type of thread used thereon. Thus, in a preferred embodiment, the length of engagement for an API "long thread" may be used for an eight inch flow line.

As illustrated in FIG. 6, connector ends 115 and 115' are preferably provided with circumferential, external grooves 119 formed near the junction of the threaded portions 112 with the intermediate portion 113. These grooves 119 may assume standard dimensions to accommodate conventional O-rings 114 such as 2-371 O-rings manufactured by Parker or National. O-rings 114 cooperate with connector sleeve 102 to form a seal therebetween. A principal purpose of this seal is to help prevent or impeded the intrusion of seawater or the like into the interstices between connector sleeve 102 and connector ends 115 and 115', as well as to form a secondary seal to prevent or impede the escape of oil or other fluids moving through the pipeline.

Pipe segments 104 and 106 operate in conjunction with a bore sealing element 108 to form a primary seal therebetween. Bore seal 108 preferably comprises a disc or ring having a maximum outside diameter slightly greater than the maximum inside diameter of the complementary groove or recess 123 formed in connector ends 115. Seal 108 structurally defines an apex 107 which is preferably bounded by two chamfered shoulders 109 of a configuration closely approximating the dimensions of the recess or groove 123 formed in each connector ends 115. When connector ends 115 are joined together in an abutting relationship and thereafter locked, bore seal 108 is encapsulated and therefore compressed so as to define an integral primary seal. It is desirable that bore seal 108, when encapsulated with connector ends 115, define a smooth bore of similar dimensions to the bore defined in pipe sections 104 and 106 so as to comprise an unobstructed flow path.

Pipe sections 104 and 106 are held in relative position by connector sleeve 102. Sleeve 102 generally comprises a tubular body defining a threaded inner bore 103. (See FIG. 7). As noted, this threaded bore 103 is compatible with the threaded connector ends 115 of pipe sections 104 and 106. The length of connector sleeve 102 is determine by the thread length of the threaded portion 112 of each pipe section. Connector sleeve 102 preferably extends beyond the ends of the threaded portions.

The makeup of the instant connector may be described as follows. The two pipe segments 104 and 106 are fitted with O-rings 114 which are placed in corresponding grooves 119. A bore seal 108 of appropriate dimensions is then positioned in the complementary groove 123 formed in the connector end 115 of one of the pipe segments. The connector sleeve 102 is then partially threaded on this pipe segment after a suitable lubricant, such as high pressure, antigalling molybdenum, cooper or aluminum based lubricant has been applied to the threaded portion 112 of each connector ends 115.

The second pipe segment is then coaxially positioned in the opposite side of the connector sleeve 102. Both pipe sections are then secured to prevent their relative rotation. This may be accomplished in a number of ways conventional in the pipe handling art. Connector 102 is then rotated to pull the pipe segments together and thereby encapsulate and compress bore seal 108. The primary seal is now formed between the two pipe segments.

Preloading of the connection is preferred to obtain an integrious seal. In an eight inch flow line, for example, it is desired that 20,000 ft/lbs. of torque be utilized to accomplish this preloading. Factors affecting the amount of torque necessary to complete a given connection include the diameter of the connector, the type of lubricant used in the make up the joint, the conditions of the thread (rusty, galled, etc.) and the geometry of the bore seal. Generally, the larger the diameter of the pipe segment the greater the amount of torque necessary to preload the seal.

It is important to the formation of an integrious seal that the pipe segments be situated in co-rotatable relation. In the embodiment illustrated in FIGS. 6 and 7, this i accomplished by utilizing a special connective joint structure. In such a structure, the leading contact edge of each pipe segment is provided with an overlapping tongue 117. To facilitate makeup, each tongue structure is preferably provided with a bevelled transition portion 113. When measured from the axis of pipe segments 106 and 104, this bevelled portion preferably adopts an angle in the range of 20°–30°.

To aid in the makeup of the connection, connector sleeve 102 is preferably provided with one or more viewing portals 116. Portals 116 generally comprise a round or oval aperture radially disposed in the connector sleeve 102. Portals 116 are preferably formed at the interface between the first and second pipe segments when said segments are secured within sleeve 102. It is contemplated that for most sizes of pipe, a ½ inch diameter round aperture will be used. Portals 116 are sealable via conventional threaded plugs or the like (not shown) which may be sealed in place via a Teflon gasket, washer, sealant, or the like. In such a fashion, it is possible to help ensure that the pipe segments adopt a desirable, abutting relationship necessary to create a leak free joint.

To also aid in makeup of the joint, pipe segments may be provided with external alignment marks or tabs 110. (See FIG. 7). In such a fashion, it will be possible for the operator to easily gauge the orientation of the tongued portion 117 of each pipe segment when said portions are otherwise removed from view by connector sleeve 102.

Portals 116 also serve as access points for remedial repair of the connection. In instances where a welded or mechanical joint has failed, it is often necessary to employ elaborate encapsulation techniques to stem the leak. Oftentimes, replacement of the joint is necessary. Portals 116 allow the injection of a sealant, e.g., a conventional plastic sealant, into the interstices between the connector sleeve 102 and the connector ends 115. This may be accomplished in the marine environment by removing the cap or plug, injecting sealant into the joint, and replacing the plug. This form of repair involves considerably less time and expense than the repair techniques outline above in association with conventional mechanical or welded joints.

Figure 10:
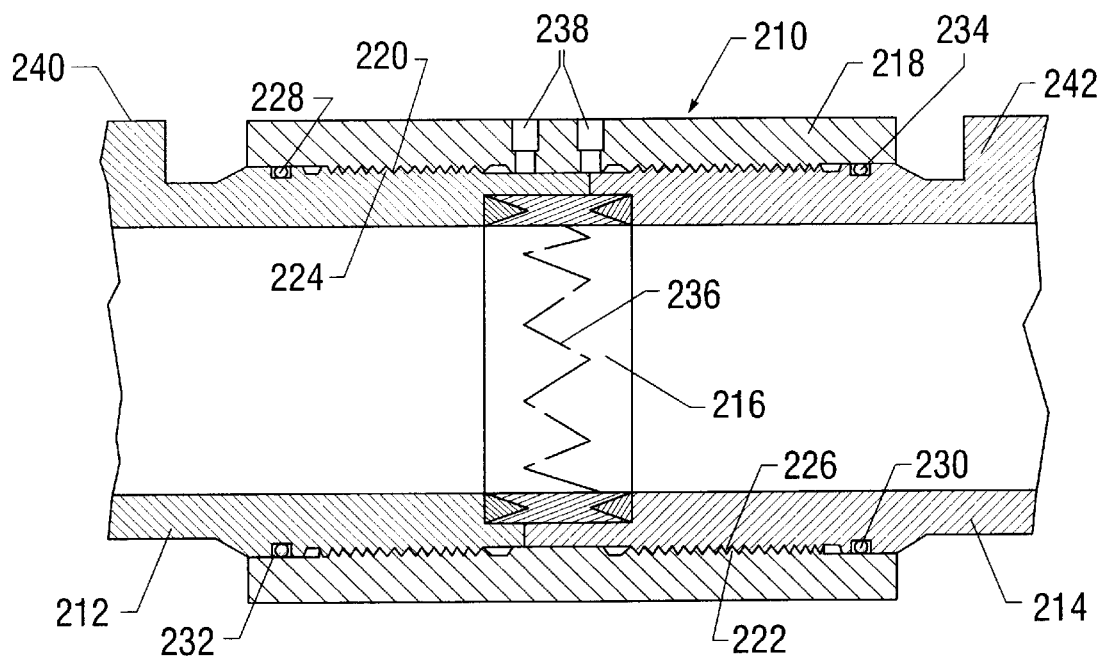
FIG. 10 is a cross-sectional view of a preferred embodiment of the present invention illustrating the relationship of the pipe sections, the dual seal and the connector sleeve.

FIG. 10 illustrates a cross-section of a dual seal connection 210 of the present invention. A first conduit or pipe 212 is coaxially aligned with a second conduit 214 and is joined in an abutting, end-to-end relationship. A dual seal 216, preferably metal, is interposed between the first and second conduits, 212 and 214. The first conduit 212, the second conduit 214, and the dual seal 216 are held together in sealing engagement by connector sleeve 218. Connector sleeve 218 has internal threads 220 and 222 that matingly engage with external threads 224 and 226 on the first and second conduits, 212 and 214, respectively. In the preferred-embodiment, external threads 224 and 226 are oppositely threaded. For example, the external threads 224 may be of right-hand orientation and the external threads 226 may be of left-hand orientation. It is envisioned that the internal and external threads can be of various types including buttress threads, ACME threads, straight threads, tapered threads or proprietary sealing-type threads common in the oil field industry. It will be appreciated, that the length of the internal and external threads is preferably determined by the recommended length of engagement for the specific type of thread used.

Also shown in FIG. 10 are external grooves 228 and 230 that are formed into the first conduit 212 and second conduit 214, respectively. These external grooves are adapted to receive conventional elastomeric O-rings 232 and 234, such as O-ring 2-371 manufactured by Parker or National. The O-rings 232 and 234 cooperate with connector sleeve 218 to form a secondary seal therebetween. This seal is adapted to prevent or impede the intrusion of sea water or the like into the connection, as well as to form a secondary seal to prevent or impede the escape of fluids transported by the conduits.

Also shown in FIG. 10 is an anti-rotation joint 236. In the preferred embodiment illustrated in FIG. 10, the anti-rotation joint 236 comprises a star or crown joint manufactured into the ends of conduits 212 and 214. The anti-rotation joint 236 prevents relative rotation between the first conduit 212 and the second conduit 214 during make up of the dual seal connection 210. FIG. 10 also illustrates inspection ports 238 located in connector sleeve 218. These inspection ports offer a way to check the complete make up of first conduit 212 and second conduit 214 to ensure a maximum seal. In the preferred embodiment, inspection ports 238 comprise threaded apertures that are large enough to allow visual inspection yet can be easily sealed with a threaded plug (not shown) or the like.

FIG. 10 also illustrates hanger lugs 240 and 242. These lugs are adapted to hang a series of connected conduits, such as illustrated by first conduit 212 while a new connection 210 is being established using dual seal 216 and second conduit 214.

Figure 11:
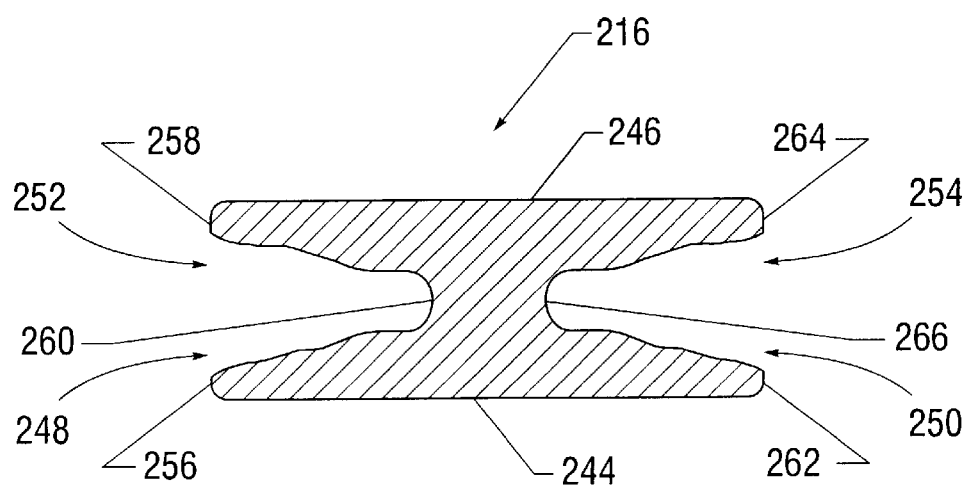
FIG. 11 is a cross-sectional view of the dual seal of the present invention.

FIG. 11 shows a cross-section of the dual seal 216 of the present invention. Seal 216 generally comprises an inner cylindrical surface 244 and an outer cylindrical surface 246. The preferred embodiment of dual seal 216 is also characterized as having four seal portions. A first portion is indicated by reference numeral 248, a second seal portion is indicated by reference numeral 250, a third seal portion is indicated by reference numeral 252 and a fourth seal portion is indicated by reference numeral 254. The first seal portion 248 begins at a first seal end 256 and the third seal portion 252 begins at a third seal end 258. Both the first and third seal portions, 248 and 252, terminate at a hinge portion 260. Similarly, second seal portion 250 begins at a seal end 262 and third seal portion 254 begins at a seal end 264. Both second seal portion 250 and fourth seal portion 254 terminate at a hinge portion 266.

Figure 12:
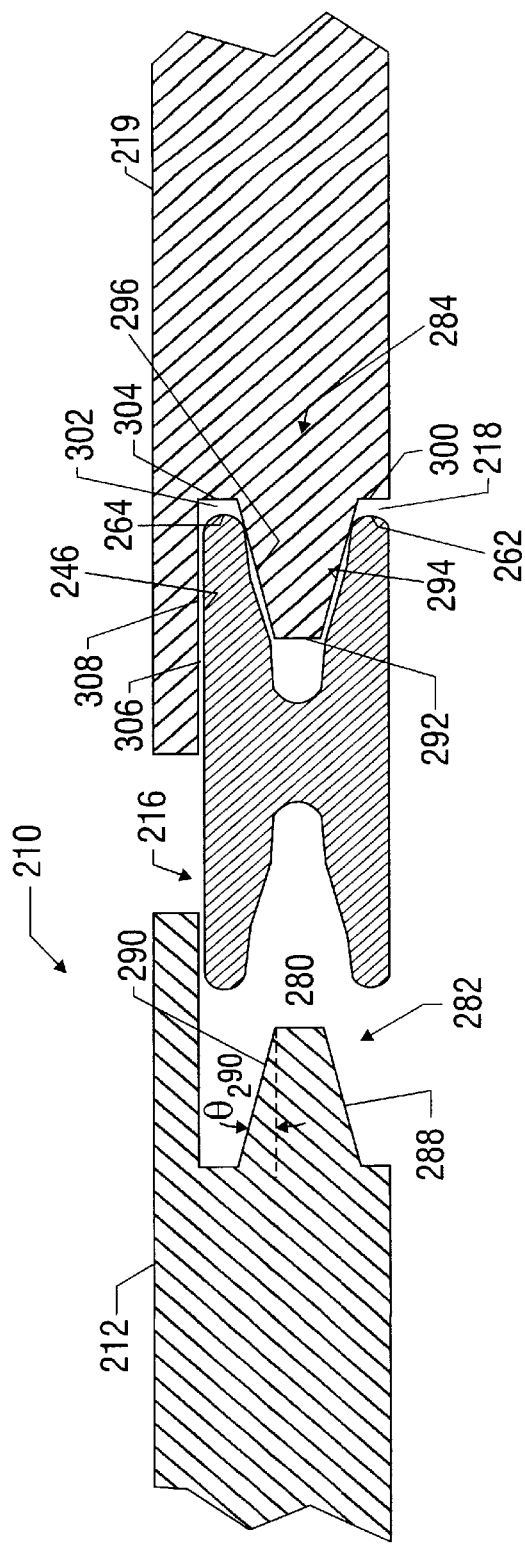
FIG. 12 is an exploded cross-sectional view of the dual seal and its seating surfaces.

Shown in FIG. 12 is a close-up of the dual seal 216 in sealing engagement with second conduit 214 and in non-sealing engagement with first conduit 212. FIG. 12 shows that both first and second conduits have a seat portion 282 and 284, respectively. Seat portion 282 comprises end surface 286, a first seat 288 and a third seat 290. Similarly seat portion 284 of second conduit 214 has an end surface 292, a second seat 294 and a fourth seat 296. Seats 288, 290, 294 and 296 are generally frusto-conical in shape and extend away from respective end surfaces 286 and 292 at an angle preferably in the range of 15° to 20°. For example, seat 290 extends at angle $\Theta_{290}$ from a centerline of the dual seal 216.

It will be understood from FIGS. 11 and 12 that first seal portion 248 engages with first seat 288 and that third seal portion 252 engages with third seat 290 when the connection 210 is in fluid tight engagement. Similarly, second seal portion 250 engages with second seat 294 and fourth seal portion 254 engages with fourth seat 296.

Also shown in FIG. 12 is a gap 298 formed between second seal end 262 and annular shoulder 300. Similarly shown in FIG. 12, is gap 302 formed between fourth seal end 264 and annular shoulder 304. Also shown is gap 306 formed between outer cylindrical surface 46 and conduit surface 308. It will be appreciated that similar gaps exist with respect to the first conduit 212 when the connection 210 is in fluid tight engagement.

Figure 13:
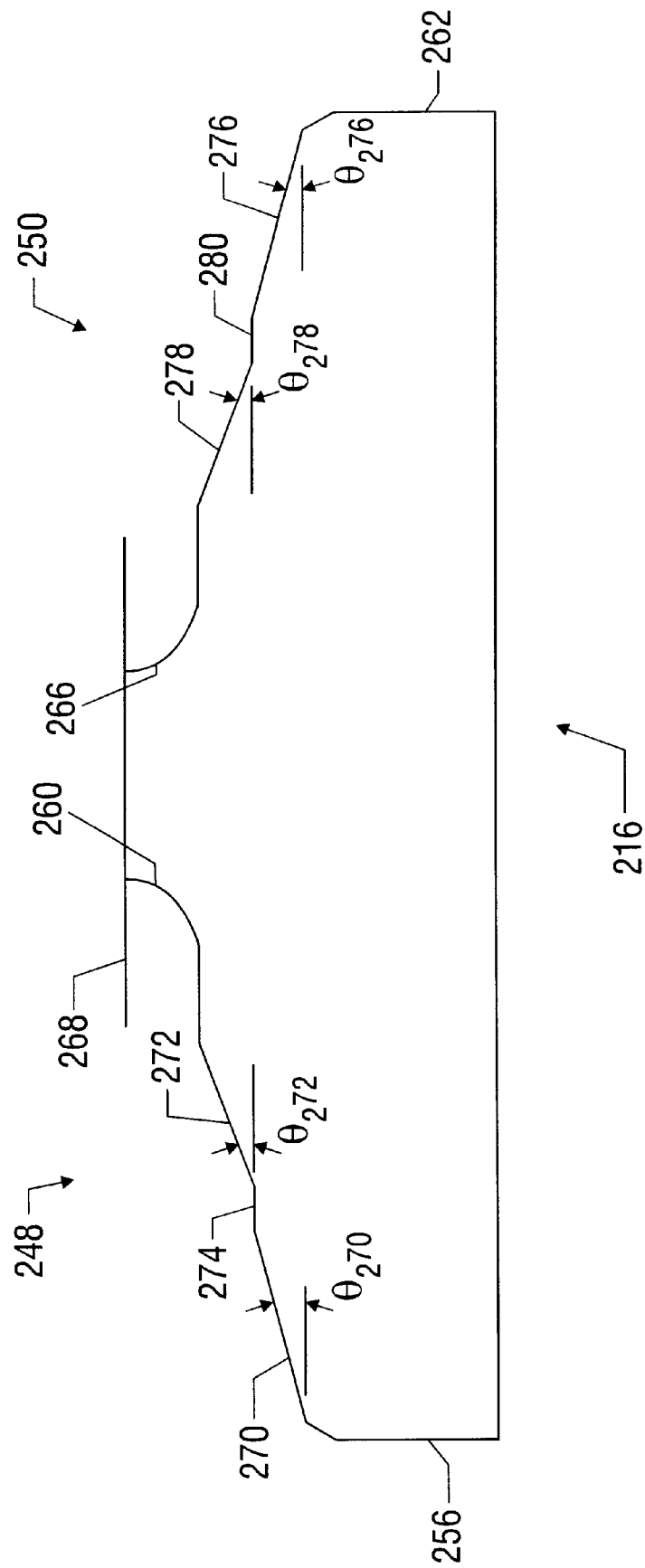
FIG. 13 is a cross-sectional view of a portion of the seal shown in FIG. 11.

FIG. 13 shows a cross-section of a portion of dual seal 216. FIG. 13 shows first seal portion 248 and second seal portion 250. It will be appreciated that the preferred embodiment of dual seal 216 is substantially symmetrical about line of symmetry 268. Thus, the disclosure for the first and second seal portions applies equally to the third and fourth seal portions of the dual seal of the present invention. First and second seal portions (248 and 250) are characterized as each having a generally frusto-conical seal surface, a cylindrical relief ring and a frusto-conical taper surface. With respect to first seal portion 248, frusto-conical seal surface 270 is separated from frusto-conical taper surface 272 by relief ring 274. Similarly, with respect to second seal portion 250, frusto-conical seal surface 276 is separated from frusto-conical taper surface 278 by a relief ring 280.

The seal surface 270 is generally frusto-conical in shape and extends from seal end 256 at angle $\Theta_{270}$. The taper surface 272 is generally frusto-conical in shape and extends from relief ring 274 at angle $\Theta_{272}$. Similarly, the seal surface 276 of the second seal portion 250 is generally frusto-conical in shape and extends from seal end 262 at angle $\Theta_{276}$. The taper surface 278 extends from relief ring 280 at angle $\Theta_{278}$.

In the preferred embodiment of the dual seal 216, seat surface angles $\Theta_{288}$, $\Theta_{294}$, $\Theta_{290}$ and $\Theta_{296}$ are in the range of about 15° to 20° from a centerline axis of the seal 216. The differential angle between seat and sealing surface (e.g., $\Theta_{288} - \Theta_{270}$ = differential seal angle) is in the range of about 0° to 2°. The differential angle between seat and taper surface (e.g., $\Theta_{288} - \Theta_{272}$ = differential taper angle) is in the range of about ±2°. The specific geometric arrangement among the seat, the seal surface, the cylindrical ring, and the taper surface are functions of various design considerations such as the outside diameter of the conduit, the wall thickness of the conduit, and the amount of area that can be dedicated for the dual seal.

As can be seen from FIGS. 12 and 13 (and FIGS. 3–5), the dual seal of the present invention is constructed such that on initial contact, seal surfaces (e.g., 270 and 276) make line contact with their respective seats. No other portions of the seat contact any portion of the dual seal at this initial make-up. As the conduits are brought into abutting relationship, the dual seal is elastically deformed, thereby energizing the dual seal and producing a fluid tight engagement. The elastic deformation of the dual seal is substantially radial with little or no longitudinal deformation as evidence by gaps 298, 302 and 306 (and similar gaps with regard to the other conduit). As the seal is radially deformed, the line contact on the sealing surfaces increases to area contact. In the final, fluid tight condition, the gap 306 may be consumed by the expanding, energized dual seal 216, but end gaps 300 and 302 will remain. Also, in the energized condition, the seat portions may contact the dual seal at locatins other than the area contact on the seal surfaces, but it will be understood that any such contact is substantially non-load bearing. In other words, in the preferred embodiment, the only load carried by the dual seal is that associated with the area contact on the seal surface.

In the preferred embodiment, the seal surface angles are one degree (1°) less than the angle of the associated seats. For example, the seal surface 270 of first seal portion 248 engages with seat 288 of seat portion 282. In the preferred embodiment, seal surface angle $\Theta_{270}$ is 1° less than seat angle $\Theta_{288}$. It will be appreciated that these relationships will apply to all seal surfaces and seats of the preferred embodiment. Thus, for the preferred embodiment, seal surface angle $\Theta_{270}$ is 14°, seat angle $\Theta_{288}$ is 15°, and taper surface angle $\Theta_{272}$ is 13°. It is preferred that the seat and seal surfaces be finished to a 32 $\mu$ in surface roughness or better.

Figure 14:
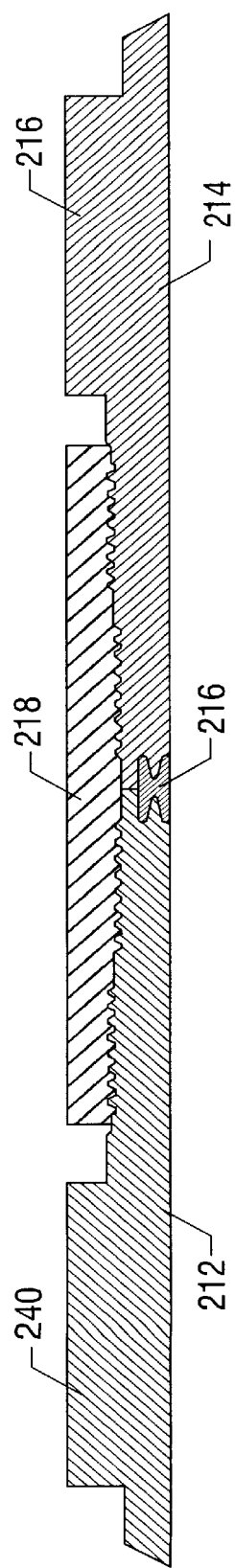
FIG. 14 is a cross-sectional view of an embodiment of the present invention.

Referring now to FIG. 15, a dual seal connection of the present invention is shown in exploded view. In the context of establishing a sub-sea pipeline, first conduit section 212 can be hung from the working ship (not shown) by lug 240 while second conduit 214 is joined. Dual seal 216 is placed on seat portion 282 of first conduit 212. Connector sleeve 218 is threaded onto first conduit 212 while second conduit 214 is also brought into threading engagement with connector sleeve 218. Connector sleeve 218 is then rotated to cause first conduit 212 and second conduit 214 to abut one another in non-rotating relationship. FIG. 14 shows a different type of anti-rotation joint 236 comprising half moon sections. As connector sleeve 218 is rotated, dual seal 216 is energized by the radial, elastic expansion of its seal surfaces. Once the dual seal 216 has been fully energized, inspection port 238, if used, is sealed and the connected string of the first conduit 212 and second conduit 214 is lowered into the marine environment until lugs at the opposite end of the second conduit are in position for establishing another connection.

It will also be appreciated that in another embodiment, inspection ports 238 can be utilized as an injection port for injecting epoxy or other sealants into the interstices of the connection 210.

The foregoing disclosure is sufficient to enable one of ordinary skill in the art to practice the preferred embodiment of the present invention. However, it will be appreciated by those of ordinary skill in the art having benefit of this disclosure that there are various modifications that may be made to the present invention without departing from the inventive scope.

What is claimed is:

1. A mechanical connection for joining conduits comprising:
   a first conduit having an end, said end comprising a seat portion that projects outwardly beyond said first conduit end, said seat portion having first and second seats each of which extend from an outermost seat end of said seat portion back toward said first conduit end;
   a second conduit having an end, said end comprising a seat portion that projects outwardly beyond said second conduit end, said seat portion having first and second seats each of which extend from an outermost seat end of said seat portion back toward said second conduit end;
   a seal member comprising four sealing surfaces, two of said sealing surfaces extend inwardly from outermost seal ends toward a first hinge portion of said seal member, said other two of said sealing surfaces extend inwardly from outermost seal ends toward a second hinge portion of said seal member; and
   a member adapted to releasably join said first and second conduit ends in abutting relationship thereby causing said sealing surfaces to sealingly engage said seat portions.

2. The mechanical connection of claim 1, wherein said seal member is metal.

3. The mechanical connection of claim 2, wherein each of said four sealing surfaces of said seal member terminate at an associated relief ring, and further comprising four taper surfaces each of which originate in an associated said relief ring and terminate at an associated said hinge portion.

4. The mechanical connection of claim 3, wherein a differential angle between said seat portion and said taper surface is in the range of 0° to 2°, inclusive.

5. The mechanical connection of claim 3, wherein each of said four sealing surfaces have an angular differentiation from each associated seat in the range of 0°–2°, inclusive.

6. The mechanical connection of claim 5, wherein said seal member elastically deforms.

7. The mechanical connection of claim 1, wherein said conduit ends further comprise anti-rotation portions that substantially prevent relative rotation between said conduits when said conduit ends abut.

8. The mechanical connection of claim 1, wherein said member is a sleeve having two ends each with internal threads; and said first and second conduit ends have external threads configured to mate with the internal threads of said sleeve.

9. The mechanical connection of claim 8, wherein the internal threads at each end of said sleeve are of opposite hand; and the external threads on said first and second conduits are of opposite hand.

10. The mechanical connection of claim 8, further comprising:
a portal in said sleeve positioned for viewing the interface between said first and second conduit ends.

11. The mechanical connection of claim 1, wherein each seal portion of said seal member forms a frusto-conical seal surface angled in the range of 13° to 20°, inclusive with respect to a centerline axis of said seal member.

12. The mechanical connection of claim 1, wherein said seal member has an outer cylindrical surface that terminates at two of said seal ends and an inner cylindrical surface that terminates at said other two seal ends and wherein each seal member end is displaced from and does not contact an associated annular shoulder of said conduit when said conduits are in fluid tight engagement.

13. The mechanical connection of claim 1, further comprising:
a secondary seal between each of said conduits and said member, said secondary seal located between the outer surface of said conduits and the inner surface of said member.

14. The mechanical connection of claim 13, wherein said secondary seals are O-rings.

15. A dual seal for a mechanical connection comprising:
an inner cylindrical surface having a first end and a second end;
an outer cylindrical surface having a third end and a fourth end;
a first seal portion extending from said first end toward a first hinge and a second seal portion extending from said second end toward a second hinge;
a third seal portion extending from said third end toward said first hinge and a fourth seal portion extending from said fourth end toward said second hinge;
each of said seal portions comprising a frusto-conical seal surface originating adjacent an associated end and terminating adjacent a cylindrical relief ring, and a taper surface originating adjacent said relief ring and terminating adjacent an associated hinge.

16. The dual seal of claim 15, wherein said seal is metal.

17. The dual seal of claim 15, wherein each of said frusto-conical seal surfaces are angled with respect to said inner cylindrical surface in the range of 13° to 20°, inclusive.

18. The dual seal of claim 17, wherein each of said seal portions are elastically deformable.

19. A method for mechanically joining conduits in fluid tight engagement comprising:
providing a first conduit having an externally threaded end with a seat portion extending away from said conduit, said seat portion having first and second seats;
placing a seal member on said seat portion of said first conduit, wherein said seal member comprises an inside cylindrical surface, an outside cylindrical surface, a first side portion and a second side portion, first and second seal surfaces extending inwardly from said first side portion and third and fourth seal surfaces extending inwardly from said second side portion, and wherein said first and second seal surfaces engage said first and second seats;
threading a first end of a sleeve having internal threads onto said external thread of said first conduit;
threading a second conduit into another end of said sleeve, said second conduit having an externally threaded end with a seat portion extending away from said conduit, said seat portion having third and fourth seats;
rotating said sleeve to bring said third and fourth seats of said second conduit into contact with said third and fourth seal surfaces of said seal member; and
rotating further said sleeve to bring ends of said first and said second conduits into abutting relation thereby energizing said seal member's sealing surfaces into fluid tight engagement with associated seats.

20. The method of claim 19, further comprising:
hanging said first conduit from a lug on said conduit while rotating said sleeve.

21. The method of claim 19, further comprising:
providing a viewing portal in said sleeve positioned for viewing an interface between said first and second conduit ends when said conduits are secured within said sleeve.

22. The method of claim 21, further comprising:
viewing said conduit end interface.

23. The method of claim 19, wherein each of said conduits has an annular shoulder and wherein ends of said seal member are displaced from and do not contact said annular shoulders when said conduits are in fluid tight engagement.

24. A mechanical connection for joining conduits comprising:
a first conduit having an end comprising a seat portion and an anti-rotation portion, said seat portion extends from said first conduit end and has first and second seats extending from an outermost seat end of said seat portion, said first conduit having external threads;
a second conduit having an end comprising a seat portion and an anti-rotation portion, said seat portion extends from said second conduit end and has first and second seats extending from an outermost seat end of said seat portion, said second conduit having external threads;
a seat area of predetermined length formed by said conduit seat portions when said first and second conduit ends abut;
a seal member comprising an outer and inner cylindrical surface both of predetermined length less than said sect area length and four sealing surfaces, two of said sealing surfaces extend inwardly from outermost seal ends toward a first hinge portion of said seal member, said other two of said sealing surfaces extend inwardly from outermost seal ends toward a second hinge portion of said seal member; each of said seal portions comprising a frusto-conical seal surface originating adjacent an associated end and terminating adjacent a cylindrical relief ring, and a taper surface originating adjacent said relief ring and terminating adjacent an associated hinge; and
a sleeve having internal threads that engage said external threads of said first and second conduits and which is adapted to releasably join said conduit ends, including said anti-rotation portions, in a non-rotating relationship.

25. The mechanical connection of claim 24, further comprising:
a portal in said sleeve positioned for viewing the interface between said first and second conduit ends.

26. The mechanical connection of claim 24, further comprising:

a secondary seal between each of said conduits and said sleeve, said secondary seal located between the outer surface of said conduits and the inner surface of said sleeve.

27. The mechanical connection of claim 26, wherein said secondary seals are O-rings.

28. The mechanical connection of claim 24, wherein said each of said conduits has lug for supporting said conduit during make-up of said connection.

29. The mechanical connection of claim 24, wherein said sleeve has two sets of internal threads, one set of internal threads are of one hand and another set of internal threads are of another hand.

30. An elastically deformable seal member for a mechanical connection comprising:

an inner cylindrical surface having a first end and a second end;

an outer cylindrical surface having a third end and a fourth end;

a first frusto-conical seal seat extending from said first end toward and terminating at a first cylindrical relief ring;

a first taper surface extending from said first cylindrical relief ring and terminating at a first hinge;

a second frusto-conical seal seat extending from said second end toward and terminating at a second cylindrical relief ring;

a second taper surface extending from said second cylindrical relief ring and terminating at a second hinge;

a third frusto-conical seal seat extending from said third end toward and terminating at a third cylindrical relief ring;

a third taper surface extending from said third cylindrical relief ring and terminating at said first hinge;

a fourth frusto-conical seal seat extending from said fourth end toward and terminating at a fourth cylindrical relief ring;

a fourth taper surface extending from said fourth cylindrical relief ring and terminating at said second hinge; and wherein said frusto-conical seal seats are angled in the range of 13° to 22°, inclusive, with respect to a centerline axis of said seal member and said taper surfaces are angled in the range of 13° to 22°, inclusive, with respect to said centerline.

31. A mechanical connection for joining conduits comprising:

a first conduit having an end, said end comprising a seat portion that extends from said first conduit end, said seat portion having first and second seats each of which extend from an outermost seat end of said seat portion;

a second conduit having an end, said end comprising a seat portion that extends from said second conduit end, said seat portion having first and second seats extending from an outermost seat end of said seat portion;

a seal member comprising four sealing surfaces, two of said sealing surfaces extend inwardly from outermost seal ends toward a first hinge portion of said seal member, said other two of said sealing surfaces extend inwardly from outermost seal ends toward a second hinge portion of said seal member, wherein each of said four sealing surfaces of said seal member terminate at an associated relief ring, and further comprising four taper surfaces each of which originate in an associated said relief ring and terminate at an associated said hinge portion; and a member adapted to releasably join said first and second conduit ends in abutting relationship thereby causing said sealing surfaces to sealingly engage said seat portions.

32. A mechanical connection for joining conduits comprising:

a first conduit having an end, said end comprising a seat portion that extends from said first conduit end, said seat portion having first and second seats each of which extend from an outermost seat end of said seat portion;

a second conduit having an end, said end comprising a seat portion that extends from said second conduit end, said seat portion having first and second seats extending from an outermost seat end of said seat portion;

a seal member comprising an outer cylindrical surface that terminates at two seal ends and an inner cylindrical surface that terminates at two other seal ends, four sealing surfaces, two of said sealing surfaces extend inwardly from outermost seal ends toward a first hinge portion of said seal member, said other two of said sealing surfaces extend inwardly from outermost seal ends toward a second hinge portion of said seal member wherein each seal member end is displaced from and does not contact an associated annular shoulder of said conduit when said conduits are in fluid tight engagement; and a member adapted to releasably join said first and second conduit ends in abutting relationship thereby causing said sealing surfaces to sealingly engage said seat portions.

33. The mechanical connection of claim 32, wherein each sealing surface terminates at an associated relief ring, and further comprising four taper surfaces each of which originate at an associated relief ring and terminate at an associated hinge.

34. The mechanical connection of claim 32, wherein the member is a threaded sleeve.

35. The mechanical connection of claim 34, further comprising:

a portal in the sleeve positioned for viewing the abutting relationship of said conduits.

36. The mechanical connection of claim 34, further comprising:

a secondary seal between the outer surface of each conduit and the inner surface of the sleeve.

* * * * *

UNITED STATES PATENT AND TRADEMARK OFFICE
CERTIFICATE OF CORRECTION

PATENT NO. : 6,070,912

DATED : June 6, 2000

INVENTOR(S) : Raymond E. Latham

It is certified that errors appear in the above-identified patent and that said Letters Patent is hereby corrected as shown below:

Column 12, line 45, delete "sect" and insert thereof --seat--.

Signed and Sealed this

Third Day of April, 2001

Attest:

NICHOLAS P. GODICI

Attesting Officer     Acting Director of the United States Patent and Trademark Office